(12) United States Patent
Zhao et al.

(10) Patent No.: US 7,346,495 B1
(45) Date of Patent: Mar. 18, 2008

(54) METHOD AND SYSTEM FOR BUILDING A DOMAIN SPECIFIC STATISTICAL LANGUAGE MODEL FROM RULE BASED GRAMMAR SPECIFICATIONS

(75) Inventors: Yibao Zhao, Beijing (CN); Yonghong Yan, Beijing (CN); Zhiwei Lin, Singapore (SG)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 10/130,859

(22) PCT Filed: Sep. 30, 2000

(86) PCT No.: PCT/CN00/00298

§ 371 (c)(1),
(2), (4) Date: Mar. 4, 2003

(87) PCT Pub. No.: WO02/29613

PCT Pub. Date: Apr. 11, 2002

(51) Int. Cl.
*G06F 17/21* (2006.01)
*G06F 17/27* (2006.01)
*G10L 15/00* (2006.01)

(52) U.S. Cl. .......................... 704/10; 704/9; 704/255; 704/257

(58) Field of Classification Search ................ 704/200, 704/9, 1, 10, 251, 255–257
See application file for complete search history.

(56) References Cited

U.S. PATENT DOCUMENTS

| 5,621,859 | A  |   | 4/1997  | Schwartz et al. |          |
|-----------|----|---|---------|-----------------|----------|
| 5,752,052 | A  | * | 5/1998  | Richardson et al. | 704/9  |
| 5,839,106 | A  | * | 11/1998 | Bellegarda      | 704/257  |
| 5,982,933 | A  | * | 11/1999 | Yoshii et al.   | 382/226  |
| 6,073,091 | A  | * | 6/2000  | Kanevsky et al. | 704/9    |
| 6,092,044 | A  | * | 7/2000  | Baker et al.    | 704/254  |
| 6,128,596 | A  | * | 10/2000 | Mackie          | 704/257  |
| 6,188,976 | B1 | * | 2/2001  | Ramaswamy et al.| 704/9    |
| 6,240,389 | B1 | * | 5/2001  | Keiller et al.  | 704/243  |
| 6,317,707 | B1 | * | 11/2001 | Bangalore et al.| 704/9    |
| 6,405,162 | B1 | * | 6/2002  | Segond et al.   | 704/9    |

(Continued)

FOREIGN PATENT DOCUMENTS

WO          WO 00/31725 A1      6/2000

OTHER PUBLICATIONS

Victor Zue, Stephanie Seneff, James Glass, Joseph Polifroni, Christine Pao, Timothy J. Hazen and Lee Hetherington, "Jupiter: A Telephone-Based Conversational Interface for Weather Information," IEEE Transactions on Speech and Audio Processing, vol. 8, No. 1, Jan. 2000.

(Continued)

*Primary Examiner*—Tālivaldis Ivars Šmits
*Assistant Examiner*—Douglas C Godbold
(74) *Attorney, Agent, or Firm*—Blakely, Sokoloff, Taylor & Zafman LLP

(57) ABSTRACT

A method and system providing a statistical representation from rule-based grammar specifications. The language model is generated by obtaining a statistical representation of a rule-based language model and combining it with a statistical representation of a statistical language model for use as a final language model. The language model may be enhanced by applying smoothing and/or adapting for use as the final language model.

19 Claims, 6 Drawing Sheets

U.S. PATENT DOCUMENTS 7,013,264 B2 * 3/2006 Dolan et al. .................... 704/9
7,020,587 B1 * 3/2006 Di et al. ......................... 703/2
7,031,908 B1 * 4/2006 Huang et al. .................. 704/9

OTHER PUBLICATIONS

Search Report for PCT/CN00/00292; mailed Apr. 12, 2001; 1 page.

* cited by examiner

METHOD AND SYSTEM FOR BUILDING A DOMAIN SPECIFIC STATISTICAL LANGUAGE MODEL FROM RULE BASED GRAMMAR SPECIFICATIONS

FIELD OF THE INVENTION

The present invention relates generally to natural language processing and to speech processing systems. More particularly, the present invention relates to a method and system for building a statistical language model from rule-based grammar specifications.

BACKGROUND OF THE INVENTION

The ability of computer systems to process and recognize speech has vastly improved with the progress of technology. These improvements have given rise to new areas of speech processing technology, which are being utilized in various fields today. Language models play a very important role in speech processing systems. There are two common types of language models that are used often today. One is a rule-based language model (RLM) and the other is a statistics-based language model (SLM).

RLM uses general linguistic or domain knowledge (i.e. Syntactic or semantic knowledge) to create grammar rules. These rules are used for governing natural language processing in a speech processing system. The disadvantage of RLM is that it works well only in dosed environment. Another disadvantage of using a rule-based system is that the created rules are often not complete enough to cover all circumstances when the system works in an open environment. Due to lack of complete knowledge, the rule-based system lacks the ability to perform accurately and with precision. Another disadvantage of a rule-based system is when a large amount of rules are used decoding speed slows down drastically and creates a fatal situation during real-time system implementation.

An SLM uses a large amount of text to determine its model parameters automatically. The model parameters govern natural language processing or speech recognition in an SLM based system. The SLM can be trained more easily and can decode at a faster speed. However, a disadvantage of the SLM is that it lacks in quality and accuracy since it depends on a corpus to train the SLM. A corpus is a data set collected from real-world applications. For example, text from a newspaper is considered as a text corpus. Therefore, a statistical language model requires a huge corpus with a very large coverage to perform at sufficient levels. In practice, the large corpus and coverage requirements impose great limitations a system, especially in narrow-domain dialogue system. Thus, statistical language models lacks in accuracy and performance.

BRIEF DESCRIPTION OF THE DRAWINGS

The features and advantages of the present invention are illustrated by way of example and not intended to be limited by the figures of the accompanying drawings in which like references indicate similar elements and in which.

DETAILED DESCRIPTION

A method and system for building a statistical language model from rule-based grammar specifications are described. A statistical representation from a rule-based language model is obtained. The statistical representation from the rule-based language model is combined with a statistical representation from a statistical language model to generate a final language model.

By combining both statistical representations, the language model possesses both real-world and hand-crafted knowledge. This large knowledge base allows a language model to be used effectively in recognizing a variety of domain specific or natural language speeches. In addition, by combining both statistical representations, the language model represents adequately both models without using a large memory space. Thus, speech processing systems can operate at faster speeds while maintaining accuracy in speech or natural language processing.

Figure 1:
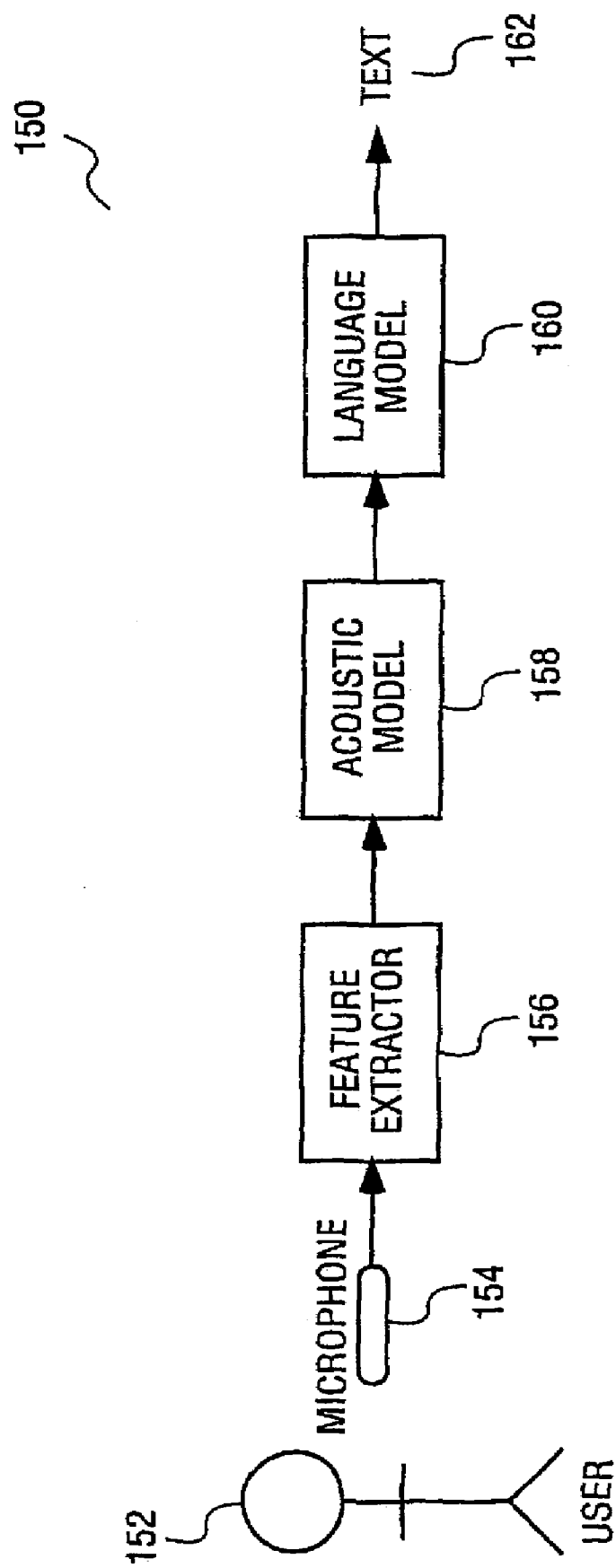
FIG. 1 is a block diagram of an exemplary speech processing system according to one embodiment.

FIG. 1 is a block diagram of an exemplary speech processing system 150 for practicing the invention. The speech processing system 150 is able to process speech into a text format. The speech processing system 150 includes a microphone 154, a feature extractor 156 coupled to the microphone 154, an acoustic model 158 coupled to the feature extractor 156, and a language model 160 coupled to the acoustic model 158. Items of the speech processing system 150 could be presented as circuitry or software.

A feature extractor 156 coupled to a microphone 154 receives a speech signal from the microphone 154. The speech signal corresponds to speech by a user represented by reference number 152 spoken into the microphone 154. The feature extractor 156 receives the speech signal and converts the spectral measurements of speech to a set of features. The set of features describe the acoustic properties of various phonetic sounds for example nasal or friction sounds.

An acoustic model 158 coupled to the feature extractor 156 receives the set of features. The acoustic model 158 compares the set of features to acoustic-phonetic sounds stored in the model. The acoustic model 158 decodes the set of features according to stored acoustic-phonetic sounds and sends the decoded information to the language model 160.

A language model 160 coupled to the acoustic model 158 receives information from the acoustic model 158. The information contains decoded information from the acoustic model as well as information that has been sent by the feature extractor 156, which has not been decoded by the acoustic model 158. The language model 160 evalates both decoded and non-decoded information and converts to text. The language model building method is further described in FIG. 2.

Figure 2:
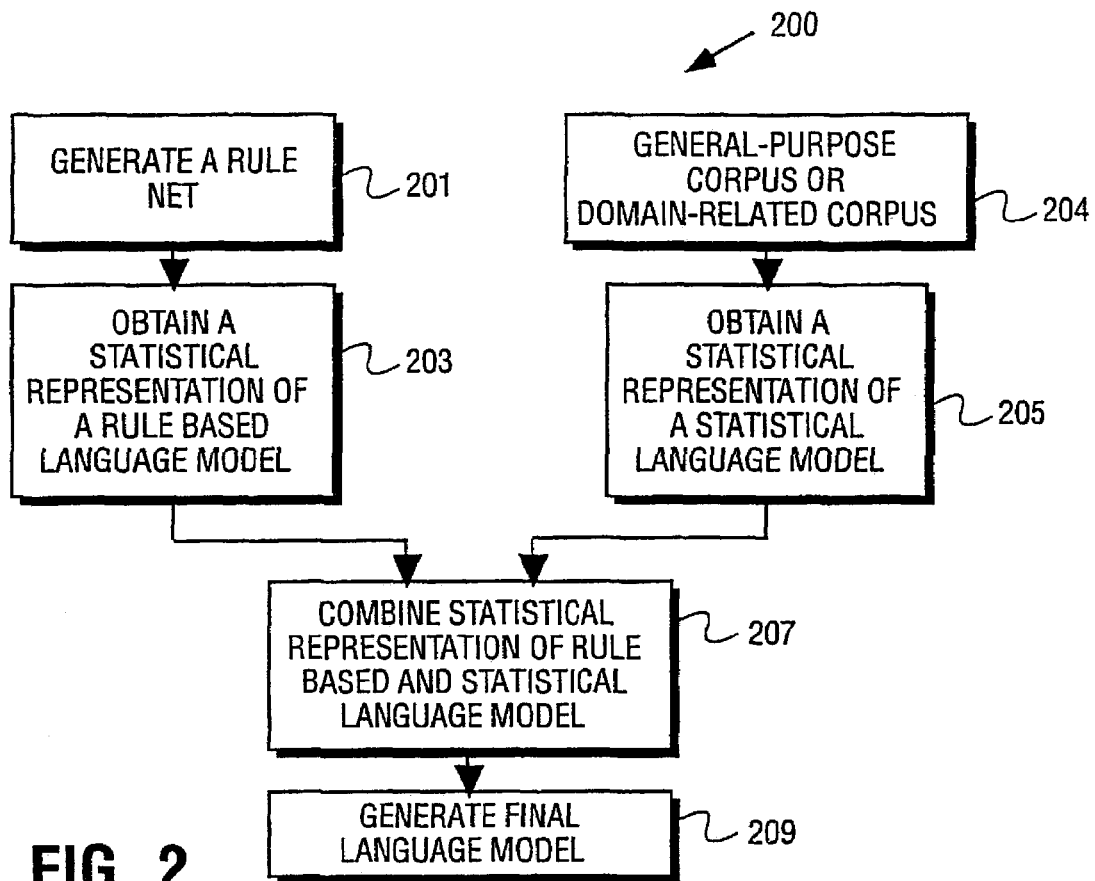
FIG. 2 is a flow chart of an operation to generate a final language model using statistical representations according to one embodiment.

FIG. 2 is a flow chart of an operation 200 to generate a final language model using statistical representations according to one embodiment. Operation 200 can be implemented by digital processing system 700. Operation 200 also allows an algorithm to combine the statistical representations of rule-based and statistical based language systems for use as a final language model in a speech processing system.

Figure 3:
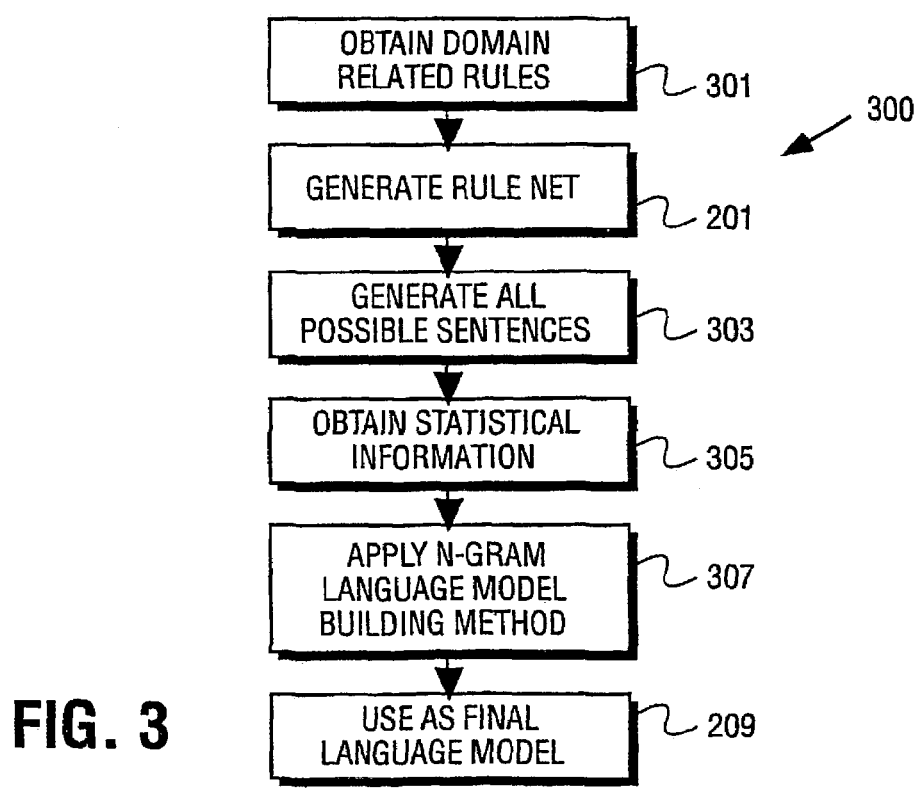
FIG. 3 is a flow chart of an operation to generate a final language model using statistical representations according to one embodiment.
Figure 4:
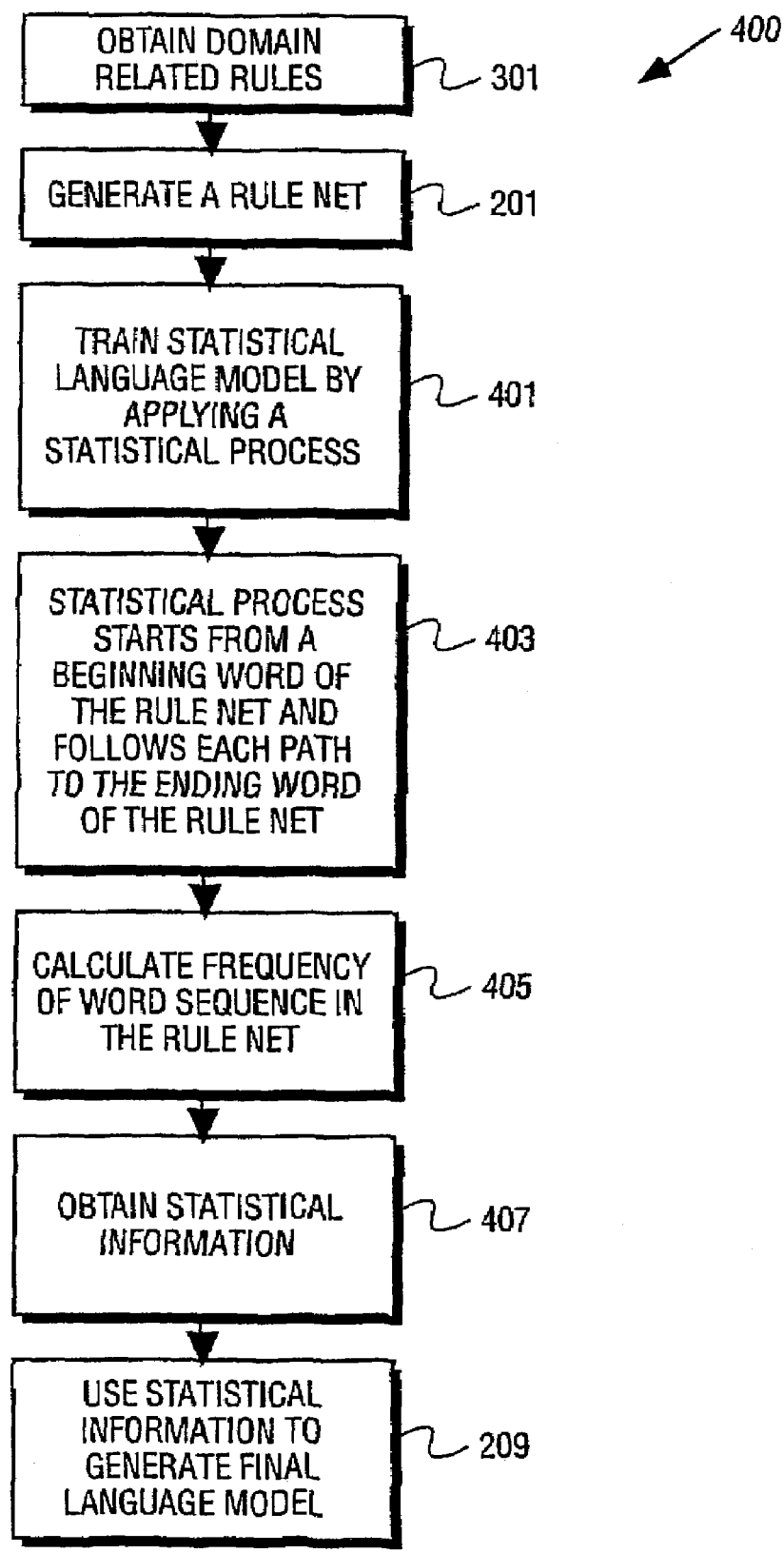
FIG. 4 is a flow chart of an operation to generate a final language model using statistical representations according to one embodiment.

Referring to FIG. 2, at operation block 201, a rule net is generated. The rule net is a net of grammar rules derived from general linguistics or domain knowledge such as syntactic or semantic knowledge. These rules are created for governing the use of words in the rule net. The rule net can also be used directly as a language model. FIGS. 3 and 4 further describe detailed aspects of collecting rules to generate the rule net and rule creations for various embodiments.

At operation block 203, a statistical representation of the rule-based language model is obtained using the generated rule net. The statistical representation is obtained through traversing the rule net or from the sentences generated from the rule net. A statistical formula is applied to obtain the statistical representation while traversing the rule net. The application of the formula results in an evaluation of the entire domain of the rule-based language model. Further details of obtaining the statistical representation of rule-based language model are described in FIGS. 3 and 4.

At operation block 204, general-purpose or domain-related corpus are obtained. The SLM obtained from a RLM is often not robust. A corpus can be used to smooth the RLM-based SLM and make it robust. General-purpose or domain-related corpus can be used separately or together.

At operation block 205, a statistical language model is build from the corpus obtained in block 204. As described previously, the statistical language model uses a large amount of corpus text to determine automatically the language model parameters. A statistical representation of a statistical language model is obtained using these model parameters. The statistical language model is further described in FIGS. 3 and 4.

At operation block 207, statistical representations of rule-based and statistical language models are combined. For example, a computer having a predefined algorithm may combine the statistical representations using the predefined algorithm. The combination is often enhanced by smoothing/adapting the rule-based SLM with a general-purpose SLM or domain-related SLM. Further combining details are described in FIG. 6.

At operation block 209, a final language model is generated. The final language model is a result of combining the statistical representation of a rule-based model and statistical language model.

FIG. 3 is a flow chart of an operation 300 to generate a final language model using statistical representations according to one embodiment. Operation 300 also allows generation of a final language model to be used in a speech processing system by generating all possible sentences from a rule net.

Referring to FIG. 3, at operation block 301 domain-related rules are obtained for use in generating a rule net. Domain-related rules are grammar rules handcrafted from general linguistics or domain knowledge such as syntactic or semantic knowledge. Preparation of domain-related rules require obtaining as many domain-related rules as possible. Alternatively, preparation of domain-related rules require obtaining domain-related rules as broad as possible. Numerous and broad domain-related rules aid in providing enough knowledge for generation of a good performance rule net.

For example, domain-related rules may be written using rule-based grammar which complies with Backus-Naur Form (BNF) which is a standard grammar form as follows:

$tagname=Zhiwei Lin|Juan Han|Yibao Zhao;
$attendee=$tagname [$attendee];
$rule1=I want to have a meeting with $attendee;
$rule2=I would like to meet with $attendee today.

In the above example, the symbol "|" indicates "or", the symbol "[x]" indicates that "x" can be omitted, and the symbol "$x" indicates that it is a variable. The above exemplary rules can be used to derive a large number of sentences. For example, using the above exemplary rules the following sentences can be derived:

I want to have a meeting with Zhiwei Lin.
I want to have a meeting with Zhiwei Lin, Juan Han.
I want to have a meeting with Yibao Zhao, Zhiwei Lin.
I would like to meet with Juan Han, Zhiwei Lin today.

Figure 5:
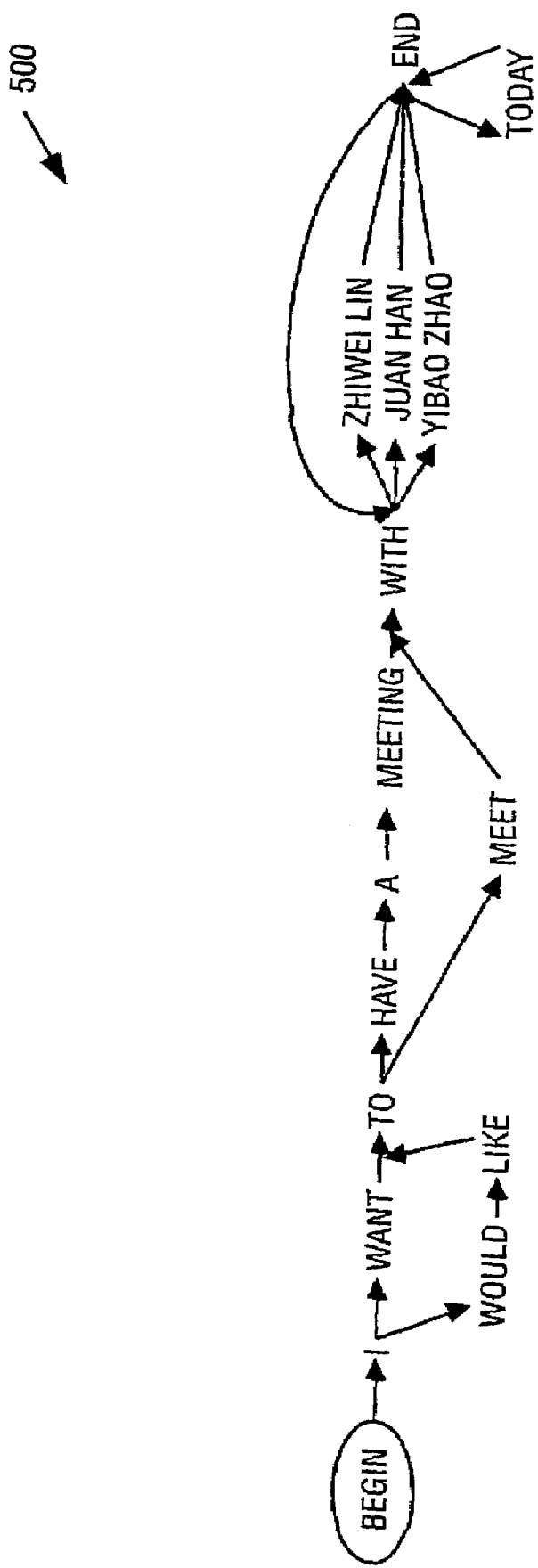
FIG. 5 is an illustration of a rule net and possible paths for the rule net according to one embodiment.

Next, a rule net is generated using all the domain-related rules obtained. An exemplary rule net is shown in FIG. 5 in which each path from a beginning to an end expresses a valid sentence.

At operation block 303, all possible sentences are generated using the rule net. The domain-related rules guide the type of sentence to be created. For example, using the two domain-related rules stated earlier, i.e., $rule1, and $rule2, infinite number of sentences can be generated. Thus, it is beneficial to have rules since more possible sentences can be created.

At operation block 305, statistical information is obtained. The statistical information is obtained from the generated sentences. The statistical information is obtained through counting the frequency of n-gram in the sentences.

At operation block 307, a conventional N-Gram language model generating method is applied to the statistical information, and a statistical language model is generated. The N-Gram language model is a standard application model. In operation, the N-Gram language model approximates a word based on a preceding word. The N-Gram language model enhances the probability that a subsequent word in a sentence follows a precedent word according to the language model.

At operation block 209, a final finished language model is generated from the obtained statistical information. Smoothing/adapting function may be applied before using the language model as a final language model. Smoothing/adapting is further described in FIG. 6.

FIG. 4 is a flow chart of an operation 400 to generate a final language model using statistical representations according to one embodiment. Operation 400 also allows generation of a final language model by training a statistical language model directly from a word-based rule net that is generated using domain-related rules.

Referring to FIG. 4, at operation block 401, a statistical process is applied for training the statistical language model.

At operation block 403, a statistical process is applied to the rule net for obtaining the statistical information. The statistical process may be performed by using a computer (e.g., digital processing system 700) using an algorithm that describes the statistical process. The statistical process is to go through each path of a rule net from a beginning word to an ending word. FIG. 5 shows an exemplary in which rule net and the arrows point to all the possible paths that can be taken. The statistical process goes through each possible path and obtains a statistical representation.

At operation block 405, a calculation is performed. The calculation consists of counting the frequency of each word sequence in the rule net. An algorithm is executed which reviews all the word sequences in the rule net and follows each path in the rule net for counting the frequency of each word sequence in a path. The word sequences at same position in the rule net are counted only once although they may appear in more than one path. The counting process is performed by using a formula (1) shown below. An algorithm executes the formula (1) to follow each path in a sentence and count the same part in a sentence clause only once. In operation, the frequency of the word sequence is dictated by the following formula (1).

$$C(w_i, w_{i+1}, \ldots, w_{i+N-1}) = \sum_{\substack{w_l = w_{j_{l-i+1}}, l=i \cdots i+N-1 \\ (w_{j_1}, w_{j_2}, \ldots, w_{j_N}) \in PNet}} (w_{j_1}, w_{j_2}, \ldots, w_{j_N}) \quad (1)$$

In the above formula, "Pnet" is the N-words-length valid part path set of the net. An "N" is the history length in Ngram, and $j_i$ is the index of each word in the net. For example, when applying formula (1) to the rule net depicted in FIG. 5, the following can be obtained:

C(I, want)=1

C(want, to)=1

C(with, Zhiwei Lin)=1

. . .

Where C(with, Zhiwei Lin) is equal to 1 although the word pair (with, Zhiwei Lin) appears in six possible paths in the rule net but it counted only once. The statistical information obtained by applying the frequency counting formula is used for generating a final language model.

At operation block 407, statistical information is obtained through the counting processing in block 405.

At operation block 209, a statistical model is generated using the obtained statistical information.

Figure 6:
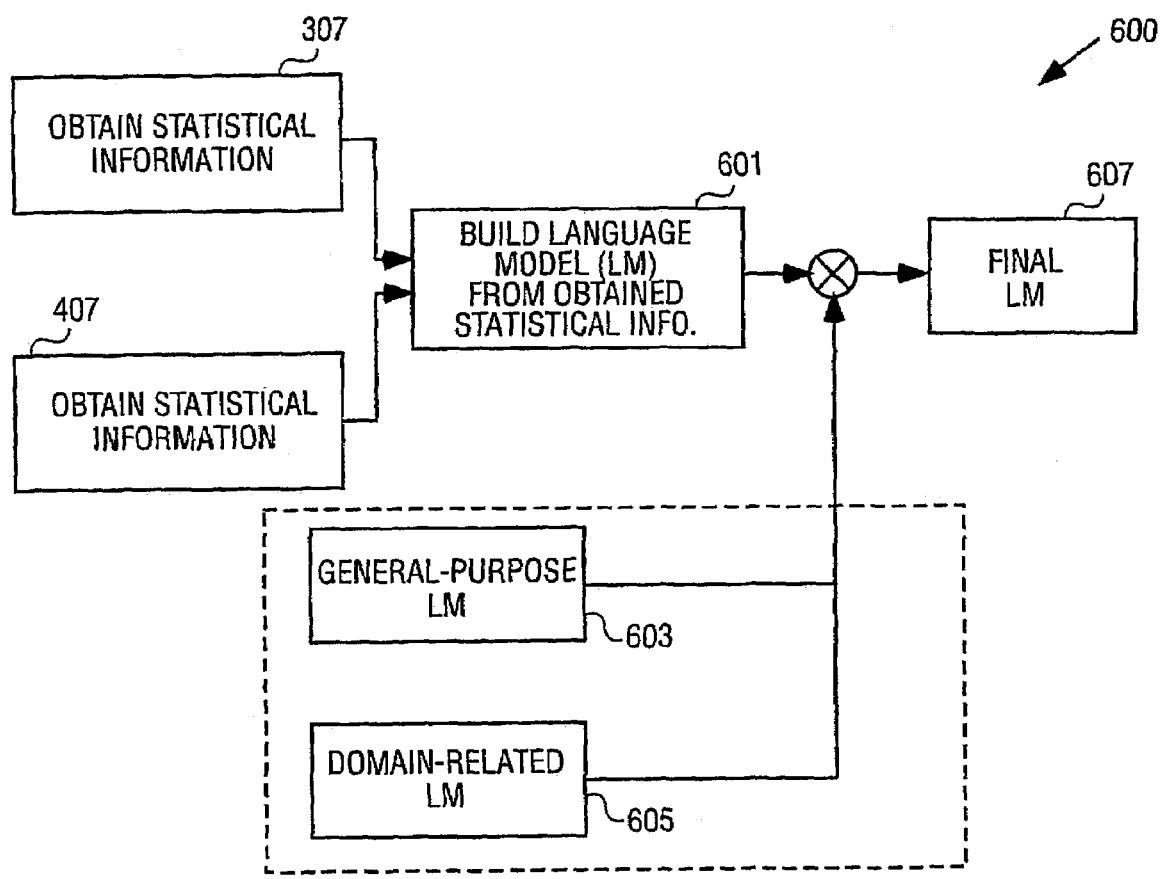
FIG. 6 is a functional flow diagram of applying a general-purpose SLM or domain-related SLM to smooth/adapt a generated model for use as a final language model according to one embodiment.

FIG. 6 is a functional flow diagram 600 of applying smoothing/adapting to a generated model for use as a final language model according to one embodiment. Operation 600 also allows smoothing/adapting to be applied to a language model before using the language model as a final language model. Operation blocks 301, 201, 401,403,405, 407, 303, 305, 307, 204 and 205 as discussed previously are used in the smoothing operation.

Referring to FIG. 6, at operation block 601, a language model is generated using operation blocks 301, 201,401, 403,405,407 or using operation blocks 301, 201, 303, 305 and 307. The language model is similar to the final language model discussed earlier in FIGS. 3 and 4, however further enhancing operations are performed on the language model before its use as a final language model. Further enhancing functions such as smoothing and adapting, discussed below, aid in obtaining a high quality performance language model.

At operation block 603, a general-purpose SLM is generated using block 204 and 205 and is used to smooth/adapt the language model. Smoothing/adapting enhances the system capability of recognizing voice. Smoothing/adapting is applied by interpolating the parameters of a system with those of a general-purpose statistical language model. A general-purpose statistical language model contains broad language phenomena that can be used to smooth/adapt the generated statistical language model obtained and enhance the system robustness.

The language model is generated by using manually hand-crafted grammar rules that contain only domain-related knowledge. Alternatively, the statistical language model is generated from a large amount of text corpus, and contains rich language phenomena, that also covers user-spoken sentences in stochastic manner. Hence, applying smoothing/adapting to the generated language model with the general-purpose SLM to smooth/adapt the generated language model generates a robust final language model.

At operation block 605, a domain-related SLM is generated using block 204 and 205, and applied to smooth/adapt the language model. Smoothing adapting uses some domain-related corpus to improve system performance. Smoothing/adapting aids the system in overcoming any deficiencies in creating rules for the rule net due to complexities in natural language by incorporating real-world applications. Smoothing/adapting also aids the system in overcoming deficiencies caused due to inability of some rare language that may not be easily describable using standard grammar rules. Smoothing/adapting uses real world application to cure any language indescribable scenario and obtain a robust system performance. Hence, smoothing/adapting is applied to the generated language model for generating a robust final language model.

The general-purpose SLM and/or domain-related SLM are applied separately to the generated language model to create a final language model. Alternatively, both general-purpose SLM and domain-related SLM are applied simultaneously to the generated language model to create a final language model.

Figure 7:
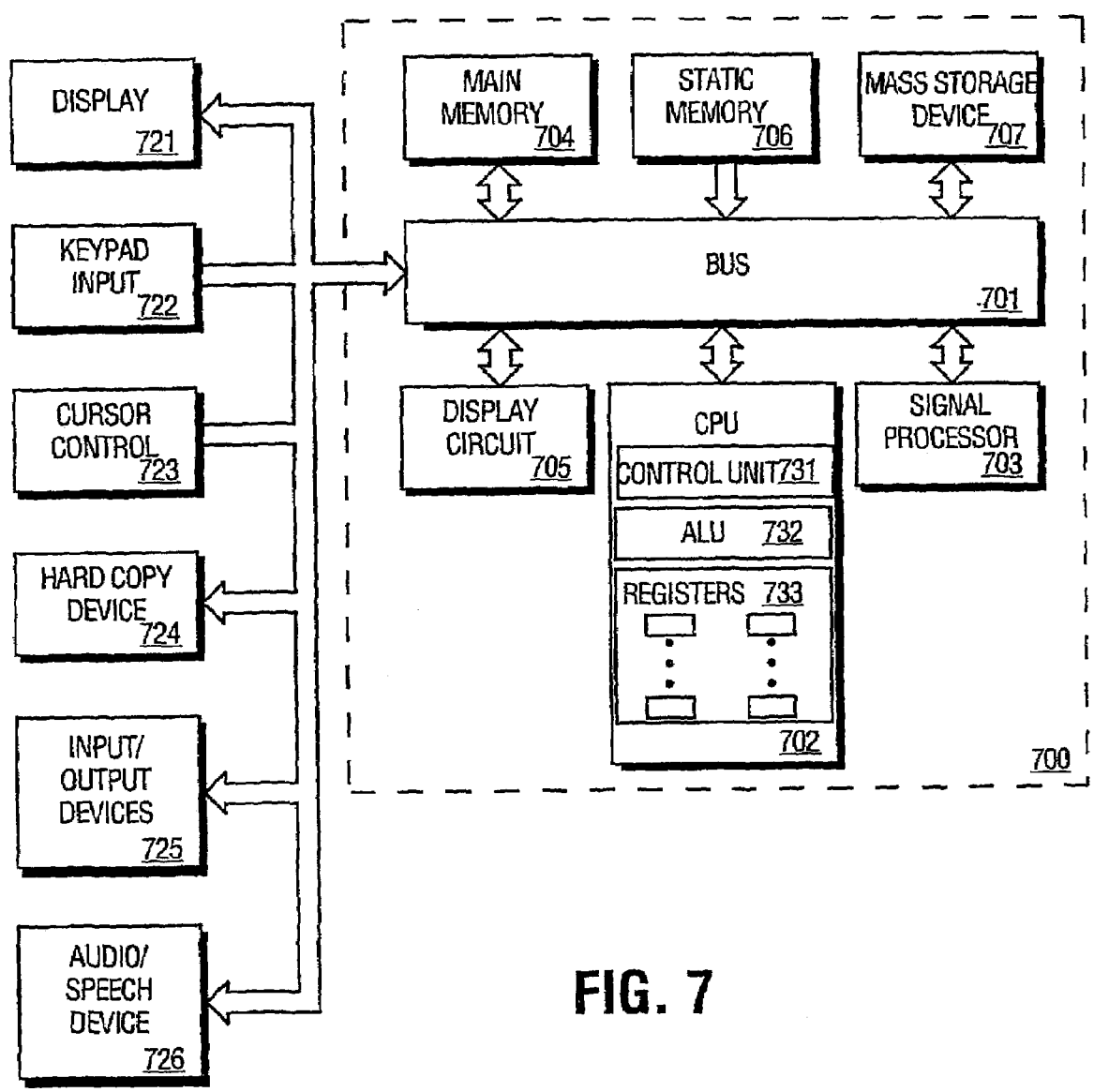
FIG. 7 is an exemplary digital processing system for practicing one embodiment.

FIG. 7 an exemplary digital processing system 700 in which the present invention can be practiced. The speech processing and speech recognition techniques described herein can be implemented and utilized within digital processing system 700, which can represent a general purpose computer, portable computer, hand-held electronic device, or other like device. The components of digital processing system 700 are exemplary in which one or more components can be omitted or added. For example, one or more memory devices can be utilized for digital processing system 700.

Referring to FIG. 7, digital processing system 700 includes a central processing unit 702 and a signal processor 703 coupled to a display circuit 705, main memory 704, static memory 706, and mass storage device 707 via bus 701. Digital processing system 700 can also be coupled to a display 721, keypad input 722, cursor control 723, hard copy device 724, input/output (I/O) devices 725, and audio/speech device 726 via bus 701.

Bus 701 is a standard system bus for communicating information and signals. CPU 702 and signal processor 703 are processing units for digital processing system 700. CPU 702 or signal processor 703 or both can be used to process information and/or signals for digital processing system 700. Signal processor 703 can be used to process speech or audio information and signals for speech processing and recognition. Alternatively, CPU 702 can be used to process speech or audio information and signals for speech processing or recognition. CPU 702 includes a control unit 731, an arithmetic logic unit (ALU) 732, and several registers 733, which are used to process information and signals. Signal processor 703 can also include similar components as CPU 702.

Main memory 704 can be, e.g., a random access memory (RAM) or some other dynamic storage device, for storing information or instructions (program code), which are used by CPU 702 or signal processor 703. For example, main memory 704 may store speech or audio information and instructions to be executed by signal processor 703 to process the speech or audio information. Main memory 704 may also store temporary variables or other intermediate information during execution of instructions by CPU 702 or signal processor 703. Static memory 706, can be, e.g., a read only memory (ROM) and/or other static storage devices, for storing information or instructions, which can also be used by CPU 702 or signal processor 703. Mass storage device 707 can be, e.g., a hard or floppy disk drive or optical disk drive, for storing information or instructions for digital processing system 700.

Display 721 can be, e.g., a cathode ray tube (CRT) or liquid crystal display (LCD). Display device 721 displays information or graphics to a user. Digital processing system 701 can interface with display 721 via display circuit 705. Keypad input 722 is a alphanumeric input device for communicating information and command selections to digital processing system 700. Cursor control 723 can be, e.g., a mouse, a trackball, or cursor direction keys, for controlling movement of an object on display 721. Hard copy device 724 can be, e.g., a laser printer, for printing information on paper, film, or some other like medium. A number of input/output devices 725 can be coupled to digital processing system 700. For example, a speaker can be coupled to digital processing system 700. Audio/speech device 726 can be, e.g., a microphone with an analog to digital converter, for capturing sounds of speech in an analog form and transforming the sounds into digital form, which can be used by signal processor 703 and/or CPU 702, for speech processing or recognition.

The speech processing techniques described herein can be implemented by executing code or instructions stored in a machine-readable medium coupled with or contained in digital processing system 700. For example, CPU 702 or signal processor 203 can execute the code or instructions stored in main memory 704 to process speech or to recognize continuous speech. The machine-readable medium can include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions can be represented by carrier wave signals, infrared signals, digital signals, and by other like signals.

Thus, a method and system for providing a statistical representation from rule-based grammar specifications have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A speech processing method comprising:
   generating a word based rule net, the rule net corresponding to a collection of hand-crafted domain-related grammar rules;
   following every path from a starting point of the word based rule net to an ending point of the word based rule net to obtain frequency of word sequence, counting the same word sequence at same position in the rule net only once, to obtain a statistical representation of the rule-based language model; and
   combining the statistical representation of the rule-based language model with a statistical representation of a statistical language model to generate a final language model.

2. The speech processing method of claim 1, wherein combining the statistical representation includes:
   generating all possible sentences using the generated word based rule net; and
   applying an N-Gram language model building method to generate the final language model.

3. The speech processing method of claim 1, wherein combining the statistical representation further includes:
   training the statistical language model from the word based rule net.

4. The speech processing method of claim 1, further comprising applying a domain-related corpus collected from real-world application to obtain a robust system performance.

5. The speech processing method of claim 1, wherein the final language model further includes smoothing the statistical language model with a general-purpose and/or a domain-related statistical language model.

6. A system comprising:
   a memory to store a statistical representation of a rule-based and a statistical language model; and
   a processor to obtain the statistical representation from the rule-based language model by generating a word based rule net, the rule net corresponding to a collection of hand-crafted domain-related grammar rules; following every path from a starting point of the word based rule net to an ending point of the word based rule net, counting the same word sequence at same position in the rule net only once, to obtain frequency of word sequence, and to combine the statistical representation of the rule-based language model with the statistical representation of the statistical language model to generate a final language model.

7. The system of claim 6, wherein the processor is to combine the statistical representation and to apply an N-Gram language model building method to generate the final language model.

8. The system of claim 6, wherein the processor is to combine the statistical representation and to train the statistical language model of the word based rule net.

9. The system of claim 6, wherein the processor is to apply a domain-related corpus collected from real-world application to obtain a robust system performance.

10. The system of claim 6, wherein the final language model further includes a smoothing function for smoothing the statistical language model with a general-purpose and/or domain-related statistical language model.

11. A storage medium having stored therein a plurality of machine executable instructions, wherein when executed, the instructions perform a method comprising:
    generating a word based rule net the rule net corresponding to a collection of hand-crafted domain-related grammar rules;
    following every path from a starting point of the word based rule net to an ending point of the word based rule net to obtain frequency of word sequence, counting the same word sequence at same position in the rule net only once, to obtain a statistical representation of the rule-based language model; and
    combining the statistical representation of the rule-based language model with a statistical representation of a statistical language model to generate a final language model.

12. The storage medium of claim 11, wherein combining the statistical representation includes:
    generating all possible sentences using the generated word based rule net; and
    applying an N-Gram language model building method to generate the final language model.

13. The storage medium of claim 11, wherein combining the statistical representation further includes:
training the statistical language model from the word based rule net.

14. A method of obtaining a statistical language model (N-Gram) comprising:
applying a statistical process to a word based rule net;
following every path from a starting point of the word based rule net to an ending point of the word based rule net to obtain frequency of word sequence, counting the same word sequence at same position in the rule net only once, to obtain statistical information; and
training a statistical language model from the statistical information obtained from the word based rule net.

15. The method of claim 13, wherein the statistical process further includes using the formula $$C(w_i, w_{i+1}, \ldots, w_{i+N-1}) = \sum_{\substack{w_l = w_{j_{l-i+1}}, l=i\cdots i+N-1 \\ (w_{j_1}, w_{j_2}, \ldots, w_{j_N}) \in PNet}} (w_{j_1}, w_{j_2}, \ldots, w_{j_N})$$

where PNet is the N-words-length valid part path set of the net, and N means the history length in Ngram, and $j_i$ is the index of each word in the net.

16. A system comprising:
a memory to store a statistical language model (N-Gram) and statistical information; and
a processor to apply a statistical process to a word based rule net, to obtain statistical information, and to train a statistical language model from statistical information obtained from the word based rule net, wherein the processor is to count word sequences by following every path from a starting point of the word based rule net to an ending point of the word based rule net to obtain frequency of word sequence, and to count the same word sequence at same position in the rule net only once.

17. The system of claim 16, wherein the statistical process further includes using a formula, wherein the formula being $$C(w_i, w_{i+1}, \ldots, w_{i+N-1}) = \sum_{\substack{w_l = w_{j_{l-i+1}}, l=i\cdots i+N-1 \\ (w_{j_1}, w_{j_2}, \ldots, w_{j_N}) \in PNet}} (w_{j_1}, w_{j_2}, \ldots, w_{j_N})$$

where PNet is the N-words-length valid part path set of the net, and N means the history length in Ngram, and $j_i$ is the index of each word in the net.

18. A storage medium having stored therein a plurality of machine executable instructions, wherein when executed, the instructions perform a method comprising:
applying a statistical process to a word based rule net;
following every path from a starting point of the word based rule net to an ending point of the word based rule net to obtain frequency of word sequence counting the same word sequence at same position in the rule net only once, to obtain statistical information; and
training a statistical language model from the statistical information obtained from the word based rule net.

19. The storage medium of claim 18, wherein the statistical process further includes using a formula, wherein the formula being $$C(w_i, w_{i+1}, \ldots, w_{i+N-1}) = \sum_{\substack{w_l = w_{j_{l-i+1}}, l=i\cdots i+N-1 \\ (w_{j_1}, w_{j_2}, \ldots, w_{j_N}) \in PNet}} (w_{j_1}, w_{j_2}, \ldots, w_{j_N})$$

where PNet is the N-words-length valid part path set of the net, and N means the history length in Ngram, and $j_i$ is the index of each word in the net.

* * * * *